July 10, 1928.
C. SKLAREK
1,676,364
DIRIGIBLY MOUNTED LIGHT
Original Filed July 29, 1921   2 Sheets-Sheet 2
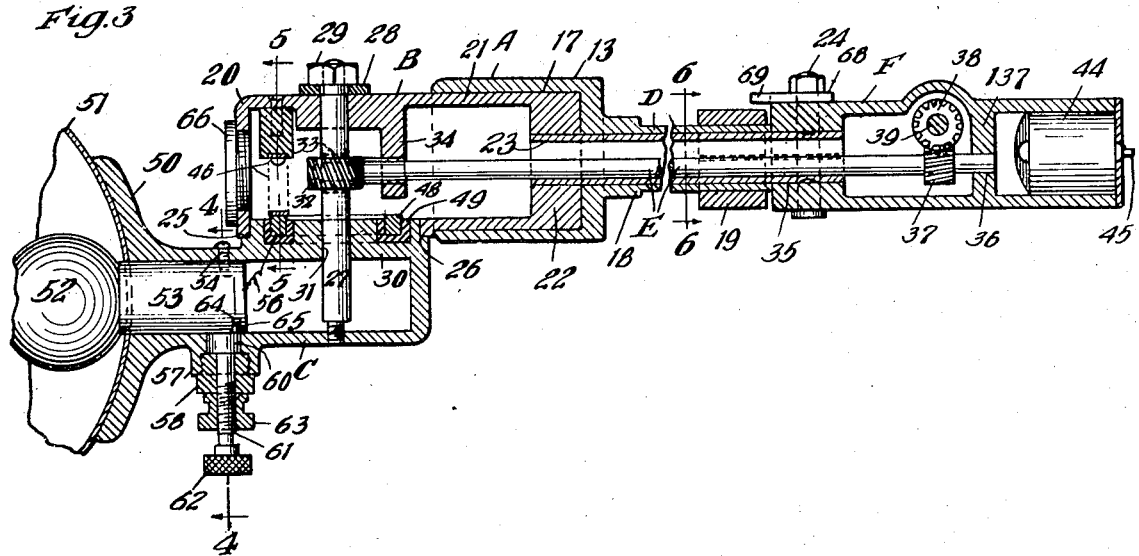
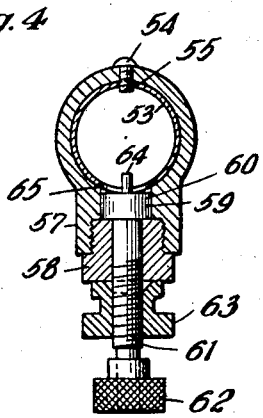
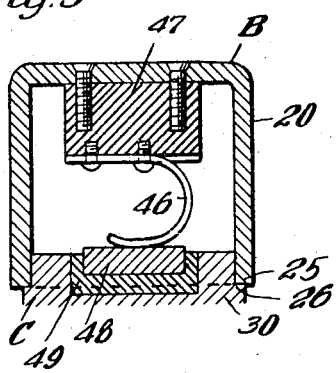
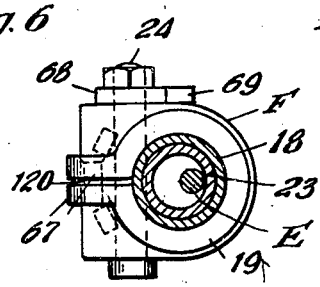
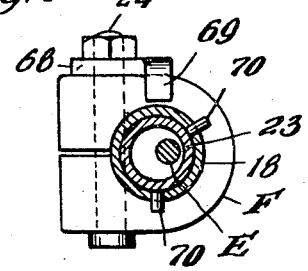
Inventor
Clifford Sklarek
By Geo. I. Haight
His Atty.

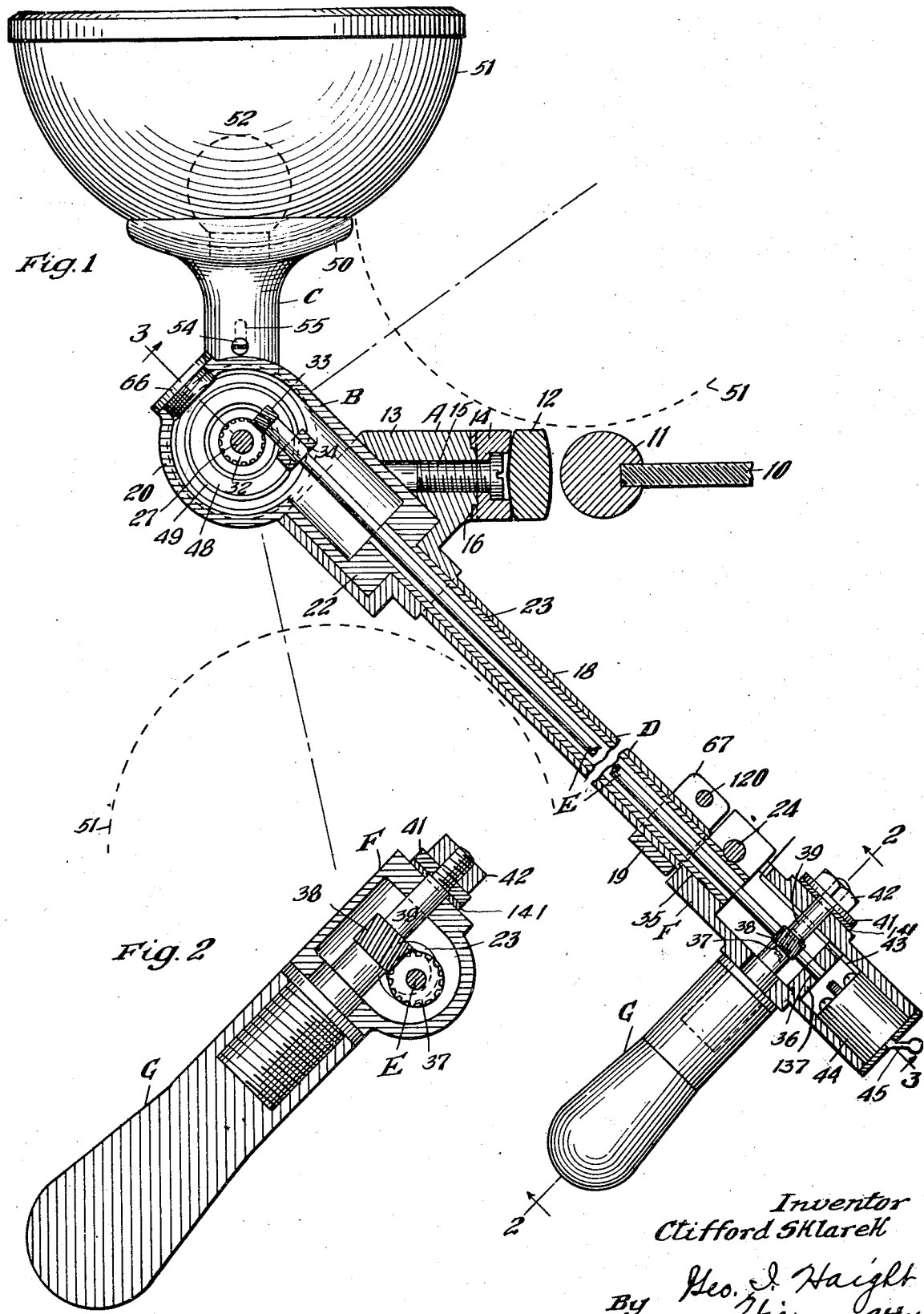

Patented July 10, 1928.

1,676,364

UNITED STATES PATENT OFFICE.

CLIFFORD SKLAREK, OF CHICAGO, ILLINOIS, ASSIGNOR TO INTERNATIONAL SPOT-LIGHT CORPORATION, OF CHICAGO, ILLINOIS, A CORPORATION OF ILLINOIS.

DIRIGIBLY-MOUNTED LIGHT.

Application filed July 29, 1921, Serial No. 488,268. Renewed May 9, 1928.

This invention relates to improvements in dirigibly mounted lights.

One object of my invention is to provide a dirigibly mounted lamp of the type usually equipped with a reflector and known as a search-light or spotlight and which is particularly adapted for use upon the windshields of automobiles, motor boats and the like where it is desirable to manipulate and adjust the light so as to throw the rays in any desired direction.

Another object of my invention is to provide a light of the character indicated which may be easily manufactured, which is pleasing in appearance, efficient and weather protected, the adjustments being effected by a single operating handle located convenient to the operator.

In the drawings forming a part of this specification, Figure 1 is a horizontal sectional view of a device embodying my improvements, the same being shown as applied to a spotlight mounted on the windshield or superstructure of an automobile. Fig. 2 is a vertical sectional view corresponding substantially to the line 2—2 of Fig. 1. Fig. 3 is a longitudinal vertical sectional view corresponding substantially to the broken sectional line 3—3 of Fig. 1. Figs. 4, 5 and 6 are detail vertical sectional views corresponding to the section lines 4—4, 5—5 and 6—6 respectively of Fig. 3, and Fig. 7 is a sectional view corresponding to Fig. 6 illustrating a different embodiment of one feature of the invention.

In said drawings, and referring to Figs. 1 to 6 inclusive, 10 denotes the glass of the windshield of an automobile, said glass being mounted in a suitable frame 11. The windshield glass is mounted in any desired manner on the superstructure of the automobile, one post of which is indicated at 12.

In carrying out my invention, I employ, broadly, what may be designated as a support A; a housing B; a lamp holder C; an operating arm D; an operating shaft E; a block F; and an operating handle G, together with certain other details of construction hereinafter explained.

The support A preferably consists of two parts 13 and 14 adapted to be rigidly locked together by means of a machine bolt 15 extending therethrough. The part 14 is adapted to fit against the post 12 and be rigidly secured thereto by screws or other suitable fastening devices, as will be understood. The parts 13 and 14 are provided on their meeting faces as indicated at 16 with complementary teeth to thereby permit the part 13 being angularly adjusted with respect to the part 14 so as to allow of the part 13 with its extension, hereinafter described, to be positioned horizontally regardless of the slope of the post 12, as more fully described in my prior application Serial No. 445,310 filed February 16, 1921 which has matured into Patent No. 1,575,722 issued Mar. 9, 1926.

The part 13 of the support A is provided on the interior thereof with a cylindrical bearing 17, said part 13 being open at its outer end. The axis of said cylindrical bearing 17 will normally extend in a horizontal plane and at an angle of approximately 45° with respect to the windshield as best shown in Fig. 1. From the inner side of the part 13 and concentric with the bearing 17 is extended a hollow, rigid, cylindric sleeve 18, the length of the same being determined in actual practice by the distance from the windshield to the steering wheel of the automobile so as to have the operating parts convenient to the driver. At its inner end, the sleeve 18 is preferably slotted and has applied thereto a friction clamp 19, the friction thereof being adjustable by means of the screw 120 in a well known manner.

The housing B is so formed as to provide, at its outer portion, a substantially cylindric inverted cup-shaped section 20, the axis of which, when in the position shown in Fig. 2, extends vertically. From the section 20 is extended horizontally a cylindric section 21 fitting and rotatable within the bearing 17. At its inner end, the cylindric section 21 of the housing is formed with a relatively thick end wall 22 and from the latter is extended horizontally a hollow cylindric operating arm 23 having bearing within the sleeve 18. The hollow operating arm 23 is extended beyond the free end of the sleeve 18 and has rigidly secured thereto the hollow block F as by means of the bolt 24 so that upon turning of the block F about the axis of the bearing 17, the housing B will be correspondingly rotated.

The bottom of the cylindrical section 20 of the housing B is open and is formed with an annular edge as indicated at 25 which fits into a rabbet 26 formed on the upper edge of the holder C so that a weather-proof joint is thereby formed while at the same time permitting the holder C to rotate relatively to the housing B. The housing B and holder C are held in assembled relation by means of a shaft 27 which may be threaded to the holder C at its bottom end and swivelled in the upper wall of the housing B as best shown in Fig. 3. At its upper end, the shaft 27 is provided with a washer 28 and a nut 29.

The holder C is provided at the top thereof with a bridge piece 30 in which is formed a suitable socket 31 for the hub of a helical gear 32 mounted on the shaft 37 and rigidly secured thereto.

Cooperable with the helical gear 32 is a second helical gear 33, the axis of which extends at right angles to the axis of the gear 32. Said helical gear 33 is rigidly mounted on the end of the operating shaft E, the hub of the gear 33 being journaled in a suitable bearing provided in a depending flange 34 integral with the housing B. The shaft E is extended through the hollow operating arm 23 to a point within the hollow block F and is suitably journaled near its inner free end in a bearing 35 carried by the inner end of the hollow operating arm 23. Another bearing is provided for the extreme inner end of said shaft E as indicated at 36, said bearing 36 being located within a transverse web 137 formed integral with the block F.

Within the block F and adjacent bearing 36, the shaft E has rigidly secured thereto a helical gear 37 which meshes with another helical gear 38 having its axis extending at right angles thereto, said helical gear 38 being rigidly mounted on a cross shaft 39 journaled in the block F. Said shaft 39 has rigidly secured thereto at its outer or left-hand end as viewed in Fig. 2, the operating handle G. The opposite end of the shaft 39 where it is extended through and beyond the block F is provided with a fiber washer 141, a metal washer 41 and a nut 42 to maintain the parts in assembled relation, to allow of the rotation of the shaft 39 by the handle G and to provide sufficient friction to prevent accidental rotation of the shaft 39.

As appears most clearly from an examination of Figs. 1, 2 and 3, the axis of the shaft 27, which is the axis of rotation of the lamp holder C, is appreciably to one side of the axis of the operating shaft E, this being occasioned on account of the use of the helical gears. Furthermore, as clearly appears from Figs. 2 and 3, the operating shaft E is eccentrically disposed within the hollow operating arm 23, this resulting on account of the use of the helical gears 37 and 38 as best shown in Fig. 2. By disposing the operating shaft E eccentrically within the arm 23, greater clearance is allowed, assuming a predetermined diameter for the arm 23, for the wire 43 which extends from the switch block 44 to the contact within the housing B about to be described. The switch block 44 is mounted in the outer end of the block F and is provided with a switch lever 45 so as to allow of the circuit being made and broken as desired.

Within the housing, the wire 43 is connected to an arcuate spring contact element 46, the latter being mounted on a block 47 of insulating material the block 47 being secured to the upper wall of the housing B. Said contact element 46 rides upon the annular contact ring 48 mounted in a grooved annular insulating element 49, the latter in turn being supported in the web 30 of the lamp holder C.

The lamp holder C, at its forward end, is provided with an arcuate flange 50 conforming to the curvature of the reflector 51 secured thereto. The lamp or light bulb proper 52 is disposed within the reflector in the usual manner, said lamp proper 52 being carried by a lamp socket 53, of cylindrical form and slidably mounted back and forth within the lamp holder C. Said lamp socket 53, while allowed reciprocating movement, is held against rotation by means of a screw 54 extended through the wall of the holder C into an elongated slot 55 in the socket 53. A short connecting wire 56 is extended between the contact ring 48 and one terminal of the lamp socket, the other terminal being grounded as will be understood.

It is sometimes necessary to adjust the lamp to the proper focus within the reflector 51 and in order to permit of this operation without taking off the lens of the spotlight or disassembling any of the parts of the light mounting, I employ the following arrangement. Referring to Figs. 3 and 4 it will be seen that the lower side of the holder C, when in the position shown in Fig. 3, is provided with a depending annular sleeve 57 into which is threaded a nut 58 having a bearing 59 at its upper end for the cylindrical head 60 of the focus adjusting screw 61. The shank of said screw 61 is extended freely through a suitable opening in the bearing nut 58 so that the screw 61 is swivelled freely with respect to said nut 58. The screw 61 is provided at its lower end with a preferably knurled knob 62 by which it may be easily rotated. A lock or jam nut 63 is carried on the screw 61 so that said screw may be locked in any desired adjusted position by screwing the nut 63 tight against the bearing nut 58. On its upper face, the cylindrical head 60 is provided with an eccentrically disposed pin 64 which is adapted to engage in a transversely extending slot 65 formed in the underside of the lamp socket 63. As will be apparent by rotating the screw 61, the lamp socket 53 can be adjusted inwardly and outwardly to thereby properly focus the lamp 52. This affords a very simple and efficient means for obtaining the necessary focus.

For the purpose of facilitating inspection of the interior of the housing B, the latter may be provided in its front wall thereof with a removable threaded plug 66.

In certain States and cities, regulations are in force governing the arcs through which dirigible spotlights may be swung in order to prevent the rays of light from the spotlights being thrown into the eye of pedestrians and operators of machines going in opposite directions. In other words, it is essential in complying with said regulations, that a spot light be prevented from throwing its rays of light within certain areas, and in order to comply with such regulations I employ the following arrangement.

As clearly shown in Fig. 6, the split friction sleeve 19 is formed with laterally extended flanges 67—67 through which the clamping screw 20 is extended. On the block F and preferably beneath the head of the screw 24, I secure a plate 68 which is extended horizontally from the block F toward the split sleeve 19 and is then bent radially inwardly as indicated at 69 so that the latter part will move circumferentially in line with said flanges 67. As indicated by the two dotted sections of the part 59 in Fig. 6, the latter will be limited in its movement to less than a complete arc of 360° by engagement with the flanges 67. By varying the width of said part 59, it is evident that the arc of rotation of the block F and consequently of the housing B can be limited to any desired amount. In conjunction with the limiting means just described, I also limit the swing or throw of the lamp holder C with respect to the housing B as indicated by the two extreme dotted positions of the lamp holder shown in Fig. 1, this being done by having the arcuate flange 50 of the holder come into contact with opposed sides of the support A.

Another method which may be employed to limit the rotation of the housing B about its horizontal axis is shown in Fig. 7 where it will be seen that I employ pins 70—70 fixed in the sleeve 18 at any desired distance apart circumferentially and with which are adapted to engage the bent-over flange 69 carried on the block F.

From the preceding description, it will be seen that all adjustments of the spotlight are readily obtained by the operator simply manipulating the operating handle G. By rotating the latter about its individual axis, the shaft E is rotated, which in turn, produces oscillation of the lamp holder about its axis on the housing B. By swinging the handle G bodily, the housing B is rotated about its horizontal axis, thereby producing the universal adjustment of the spotlight. As will be appreciated, the spotlight can be adjusted so as to throw its rays straight ahead of the machine, to either side, upwardly or downwardly, toward the back of the machine and also within the machine, the only restriction being as specifically provided for when it is necessary to comply with laws of States or cities as hereinbefore mentioned.

I have herein shown my improvements as applied to the edge of a windshield frame superstructure of an automobile. It will be understood by those skilled in the art, that, by suitably modifying the support A, the spotlight may be mounted on an enclosed superstructure of an automobile, in which case the usual corner post of the superstructure will be bored to allow the passage therethrough of the hollow sleeve 18.

I have herein shown and described what I now consider the preferred manner of carrying out the invention, but the same is merely illustrative and all changes and modifications are contemplated that come within the scope of the claims appended hereto.

I claim:

1. In a device of the character described, the combination with a support adapted to be secured to a relatively stationary element, said support being provided with a bore and a counterbore; of a housing rotatably mounted in said bore and having a hollow rigid operating arm extending through said counterbore; coacting means on said arm and said support for preventing movement of the housing out of said bore; a lamp holder rotatably mounted on said housing to oscillate about an axis extending transversely of the axis of said support; a shaft rotatably mounted in said hollow arm and extending therethrough; gearing operatively interposed between said holder and adjacent end of said arm; an operating handle carried by said operating arm at the end thereof, remote from the lamp holder, and by which said operating arm may be turned within said support, said arm being rotatable about its axis; and gearing operatively interposed between said handle and said shaft.

2. In a device of the character described, the combination with a support adapted to be secured to a relatively stationary element, said support being provided with a bearing; of a housing rotatably mounted in said bearing and provided with a rigid hollow operating arm extending therefrom; abutment means on said bearing coacting with the housing and operating arm to prevent endwise movement of said housing; a lamp holder mounted on said housing to oscillate about an axis extending transverse of but offset from the axis of said bearing; a shaft rotatably mounted in said hollow arm and extending therethrough, said shaft being eccentrically disposed within said arm; gearing operatively interposed between said holder and the adjacent end of said shaft; an operating handle carried by said operating arm at the end thereof remote from the lamp holder and by which said operating arm may be turned, said handle being also rotatable about its own axis; and gearing interposed between said handle and said shaft.

3. In a device of the character described, the combination with a support adapted to be secured to a relatively stationary element, said support being provided with a bearing; of a laterally offset housing rotatably mounted in said bearing and provided with a rigid hollow operating arm extending therefrom; a lamp holder mounted on the offset portion of the housing to oscillate about an axis extending transverse of but offset from the axis of said bearing; an electrical contact ring on said lamp holder; a shaft rotatably mounted in said hollow arm and extending therethrough, said shaft being eccentrically disposed within said arm; cooperating helical gears carried by said holder and shaft respectively; an operating handle mounted on said operating arm at the end thereof remote from the lamp holder, said operating handle being rotatable; cooperating helical gears carried by said holder and said shaft respectively; and a fixed contact member mounted in said offset portion of the housing coacting with said ring.

4. In a device of the character described, the combination with a support having a bearing; of a housing rotatably mounted in said bearing, said housing having a laterally offset portion; means for effecting rotation of said housing within its bearing; an electric contact element carried by and within said offset portion of the housing; a lamp holder rotatably mounted on said offset portion of the housing about an axis extending transverse to the axis of said bearing; means for effecting rotation of said lamp holder about its said axis; and an electric contact ring rigidly mounted on said holder and cooperable with said contact element to complete an electrical circuit in any position of the holder relatively to the housing.

5. In a device of the character described, the combination with a support; of a lamp carrying housing mounted on said support; means for effecting rotation of said housing; and means for limiting the rotation of said housing, comprising an adjustable collar on said support having extensions thereon, and other extensions on said housing and cooperable with said first extensions to limit the rotation thereof and restrict the zone of light within predetermined limits, said collar being arranged to operate as a friction brake between said support and said housing.

6. In a spotlight of the character described, the combination with a lamp adapted to be moved about axes disposed at an angle to each other; of a support; and elements for operating said lamp about its respective axes, one of said elements being disposed within the other, and said elements being rotatable relatively to each other throughout their extents, one of said elements being rotatably mounted on said support; and an electric circuit for said lamp including a conductor rotatable with said lamp, and a conductor extending through said support between said operating elements at an angle to said first mentioned conductor, said latter conductor terminating in a contact in line with and rotatably engageable by said first conductor.

7. In a dirigible light, the combination with a support; a housing rotatably mounted on said support; a lamp head rotatably mounted on said housing to turn about an axis disposed substantially at right angles to the axis on which the housing turns; and means for conducting an electric current through said support and said housing to said lamp head, said means including conducting means extending continuously through said housing and said support and terminating in a contact member insulated from said housing and support, said contact being disposed in line with, and in movable engagement with another contact carried by said lamp head and movable therewith; and electrical conductors associated with the lamp head and support to complete the electrical circuit.

8. In a dirigible light, the combination with a support; of a hollow housing having a hollow operating arm rigid therewith, said arm being mounted for rotation; a lamp holding member rotatably mounted on said housing; an electric lamp proper carried by said holding member; means within said arm for effecting rotation of said lamp holder about its axis; an electric circuit for said lamp including a wire leading through said hollow arm to said hollow housing and terminating within said housing in a contact point; a contact member movable with said lamp holding member and disposed in continuous contact with said first contact during rotation of said lamp holder, one pole of said circuit being grounded on the light structure.

9. In a dirigible light, the combination with a windshield structure; of a hollow housing movable with reference to said structure; a lamp holding member rotatably supported by said housing; an electric lamp proper carried by said holding member; means extending within said structure and said housing for effecting rotation of said lamp holder about its axis; and means for providing an electric circuit to said lamp including a wire extending continuously through said structure into said hollow housing and terminating in a contact member; and a second contact member mounted in the lamp holder and rotatable therewith, said second contact being disposed in continuous engagement with said first contact member during rotation of said lamp; and means for completing the circuit to said lamp.

10. In a dirigible light, the combination with a support; of a housing rotatably mounted to turn about one axis; a lamp mounted on said housing for rotation at an angle to the axis of rotation of said housing, and having a contact member rotatable therewith; a switch mounted on one side of said support opposite to the side on which said lamp is mounted; and a continuous conductor connected with said switch, extending through said support, through said housing, and terminating in an insulated contact member traversable by the movable contact member connected with said lamp.

11. In a dirigible light, the combination with a support; of tubular means mounted on said support and extending to one side thereof, and having means provided with a lamp carrying portion, said lamp carrying portion being mounted for rotation about one axis; a lamp carrying member mounted for rotation on said portion about an axis at an angle to the axis of rotation of said portion; a shaft rotatably mounted in said tubular means and spaced from the walls thereof, said shaft having means by which rotation thereof effects rotation of said lamp carrying member; an electric circuit for said light, including conducting means extending between the inner wall of said tubular means, and the exterior wall of said shaft; and means for completing the electric circuit through said conducting means and said lamp.

12. In a dirigible light, the combination with a support; of a tubular member rotatably mounted on said support, and provided with a lamp carrying portion; a lamp holder rotatably mounted on said lamp carrying portion; means for rotating said lamp; and a grounded circuit for said lamp including a conductor extending continuously through said tubular member and terminating adjacent the lamp carrying member in an insulated electric contact element; and a contact element carried by said lamp holding member and movable therewith, said latter contact element being disposed in engagement with said first contact member throughout rotatable movement of said lamp carrying member; and means for completing the circuit by grounding one pole thereof on the light structure.

13. In a dirigible light, the combination with a support; of an operating arm rotatably mounted on said support to turn about one axis, said arm being provided with a lamp supporting portion; of a lamp carrying member mounted on said supporting portion to turn about an axis at an angle to the axis of rotation of said arm; a lamp carried by said lamp holder; means for independently rotating said arm and said lamp holder about their respective axes; and a grounded circuit for said lamp, one pole of said circuit including a conductor extending continuously through said operating arm to a point adjacent said lamp holding member and terminating in an insulated contact element, said element being movably disposed in engagement with a second contact element carried by and rotatable with said lamp carrying member, said second contact element being connected to one pole of the lamp proper, while the other pole of said lamp is grounded on the light structure.

14. In a dirigible light of the character described, the combination with a support; of a hollow member rotatably mounted on said support and extending forwardly therefrom; a lamp rotatably mounted adjacent the outer end of said hollow member and movable therewith, said lamp having a contact element rotatable therewith; a shaft extending through said support and to the opposite sides thereof, one end of said shaft being disposed in said hollow member and spaced from the walls defining said member; operative connections between said lamp and the adjacent end of said shaft whereby rotation of the latter effects rotation of said lamp; and an electric circuit for said lamp including a conductor extending from one side of said support through the same, and through said hollow member, said conductor being arranged within the space between the walls of said hollow member and said rotatable shaft whereby rotation of the latter may be effected relatively to said conductor without disturbance of the latter, said conductor terminating adjacent said lamp, and having an insulated contact member disposed in relatively fixed position and adapted to be traversed by the contact element of said lamp head during rotation of the latter.

In witness that I claim the foregoing I have hereunto subscribed my name this 14th day of July 1921.

CLIFFORD SKLAREK.